US008149797B2

(12) United States Patent
Hummer

(10) Patent No.: US 8,149,797 B2
(45) Date of Patent: Apr. 3, 2012

(54) VISUALIZATION OF RF NEIGHBOR CORRELATION IN A SINGLE VIEW

(75) Inventor: Jesse Hummer, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1329 days.

(21) Appl. No.: 11/477,915

(22) Filed: Jun. 30, 2006

(65) Prior Publication Data

US 2008/0002639 A1 Jan. 3, 2008

(51) Int. Cl.
*H04W 4/00* (2009.01)

(52) U.S. Cl. .......... 370/338; 455/115.1; 455/115.3; 455/226.2; 455/513; 709/224

(58) Field of Classification Search .......... 370/338; 455/115.1, 226.2, 513, 517, 115.3; 709/224
See application file for complete search history.

(56) References Cited

U.S. PATENT DOCUMENTS

| | | | | |
|---|---|---|---|---|
| 6,201,954 B1 * | 3/2001 | Soliman | .................. | 455/226.2 |
| 6,430,414 B1 * | 8/2002 | Sorokine et al. | .............. | 455/442 |
| 6,862,737 B1 * | 3/2005 | Iwamura et al. | .............. | 719/321 |
| 7,286,515 B2 * | 10/2007 | Olson et al. | ................... | 370/338 |
| 7,400,612 B2 * | 7/2008 | Yamaura | ....................... | 370/338 |
| 7,769,837 B2 * | 8/2010 | Nogawa et al. | ............... | 709/222 |
| 7,978,665 B1 * | 7/2011 | Jaynes et al. | ................... | 370/338 |
| 2002/0037715 A1 * | 3/2002 | Mauney et al. | ............... | 455/421 |
| 2004/0121773 A1 * | 6/2004 | O'Brien | ........................ | 455/438 |
| 2004/0221230 A1 * | 11/2004 | Kakemura | ..................... | 715/526 |
| 2005/0036487 A1 * | 2/2005 | Srikrishna | ..................... | 370/389 |
| 2005/0245275 A1 * | 11/2005 | Byford et al. | ............... | 455/456.6 |
| 2006/0002352 A1 * | 1/2006 | Nakamura | ..................... | 370/338 |
| 2006/0129938 A1 * | 6/2006 | Humpleman et al. | ........ | 715/734 |
| 2007/0097938 A1 * | 5/2007 | Nylander et al. | ............. | 370/338 |
| 2007/0147299 A1 * | 6/2007 | Ando et al. | .................... | 370/331 |
| 2007/0183357 A1 * | 8/2007 | Bender et al. | ................. | 370/328 |
| 2008/0045220 A1 * | 2/2008 | Ishii et al. | ..................... | 455/438 |
| 2008/0062906 A1 * | 3/2008 | Baker et al. | ................... | 370/315 |
| 2010/0064225 A1 * | 3/2010 | Cunningham et al. | ........ | 715/736 |
| 2010/0093286 A1 * | 4/2010 | Noda et al. | ................. | 455/67.11 |

* cited by examiner

*Primary Examiner* — Rafael Pérez-Gutiérrez
*Assistant Examiner* — Allahyar Kasraian

(57) ABSTRACT

A system for generating a single view of wireless data including two perspectives and corresponding method therefor are described. The system comprises a device information collection mechanism arranged to collect information from a wireless device and a device information presentation mechanism arranged to cause the generation of two lists of information based on information collected by the device information collection mechanism. The two lists of information comprise: a list of wireless devices which a preselected wireless device is able to detect; and a list of wireless devices which are able to detect the preselected wireless device.

20 Claims, 4 Drawing Sheets

VISUALIZATION OF RF NEIGHBOR CORRELATION IN A SINGLE VIEW

BACKGROUND

In order to display wireless connectivity information, a network administrator must obtain the wireless connectivity information from a first wireless device. The network administrator is then able to view a single perspective of the obtained connectivity information from the perspective of the first wireless device. For example, the administrator is able to view all the wireless devices able to be detected by a first wireless device. To see whether a second wireless device is able to detect the first wireless device, the administrator must view the wireless connectivity information from the perspective of the second wireless device. In order to determine which wireless devices are able to detect the first wireless, the administrator views the wireless connectivity information from the perspective of the other wireless devices.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
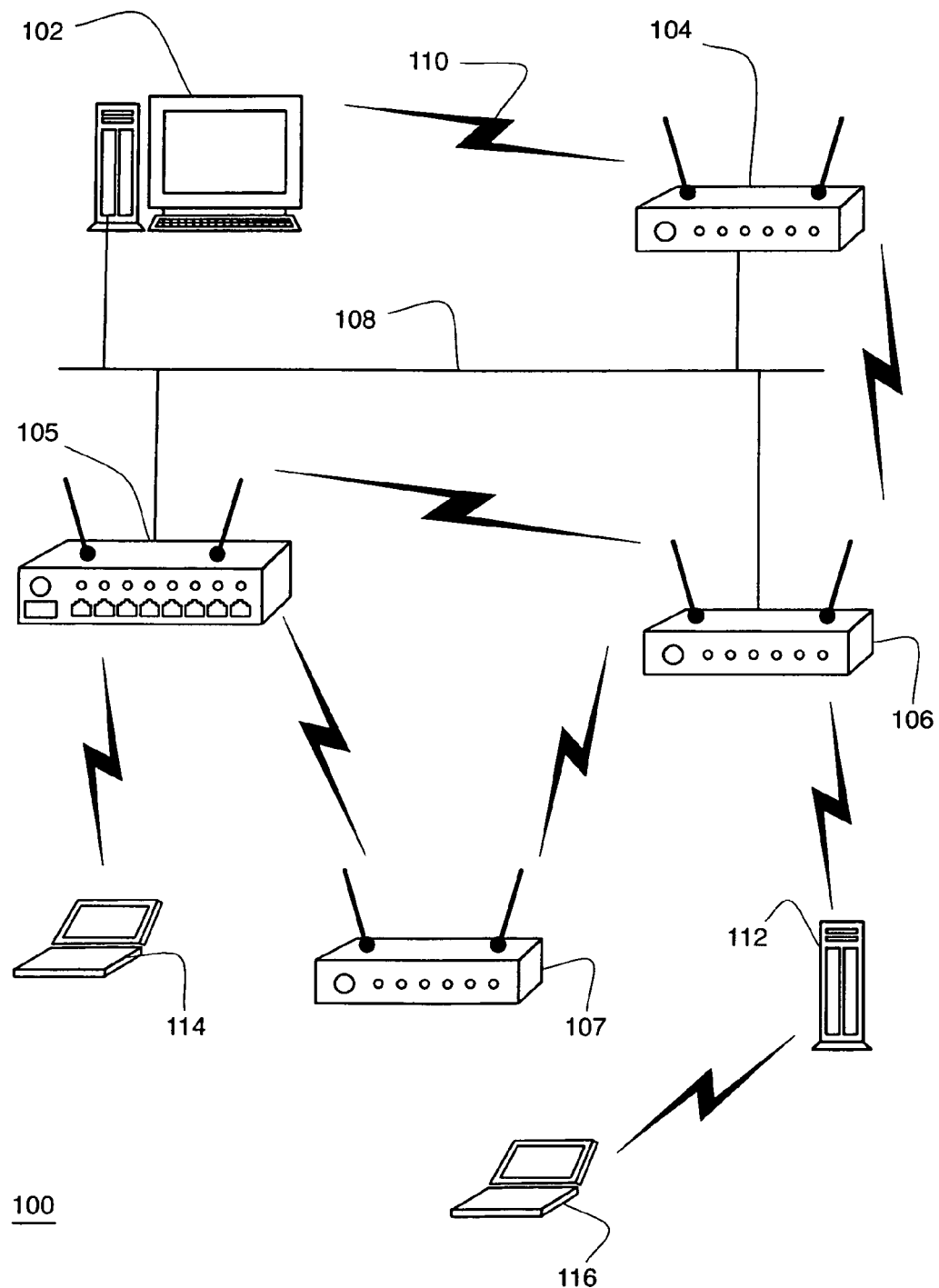
FIG. 1 is a high level diagram of a network usable in conjunction with an embodiment.

FIG. 1 depicts a network architecture 100 in which a network manager 102, e.g., a computer system, communicates with several wireless devices, i.e., radios 104-107. Radios 104-107 comprise devices having a wireless communication capability, e.g., hubs, routers, switches, access points, computer systems, and embedded logic devices including wireless capabilities. Network manager 102 communicates with radio 104 via a wireless connection 110. Network manager 102 communicates with radio 107 via wired connection 108 to one of radios 105, 106 and, in turn, via a wireless connection from radios 105, 106 to radio 107. Network architecture 100 also comprises additional wireless devices such as a wireless-capable computer system 112, a first wireless-capable portable computer system 114, e.g., a laptop, and a second wireless-capable portable computer system 116.

Due to physical barriers and/or electromagnetic properties, radios 104-107 may have asymmetric wireless communication capabilities. For example, due to an antenna position and/or antenna design, intervening walls or other obstructions, radio 107 may be able to detect both radio 105 and radio 106, whereas radio 105 may be unable to detect radio 106. The wireless detection capabilities of radios 104-107 may not be symmetric, i.e., detection of radio 105 by radio 106 may not be possible even though radio 106 may be able to detect radio 105.

A network administrator, e.g., a user at network manager 102, desires to obtain data concerning wireless connectivity within network architecture 100. The network administrator may use the wireless connectivity data to determine overlapping wireless networking coverage, gaps and/or weaknesses in wireless coverage, and identify rogue radios present in network architecture 100. Rogue radios comprise unauthorized and/or previously unknown radios positioned within network architecture 100. In particular, the network administrator may desire to view two different perspectives of wireless connectivity data for a given radio: a first perspective including radios viewable (detectable) by the given radio; and a second perspective including radios which are able to view the given radio. Given a single view with both perspectives, the network administrator receives additional pertinent information in a shorter amount of time related to a given radio and/or enables easier assessment of wireless communication conflicts and coverage with respect to a single perspective.

Figure 2:
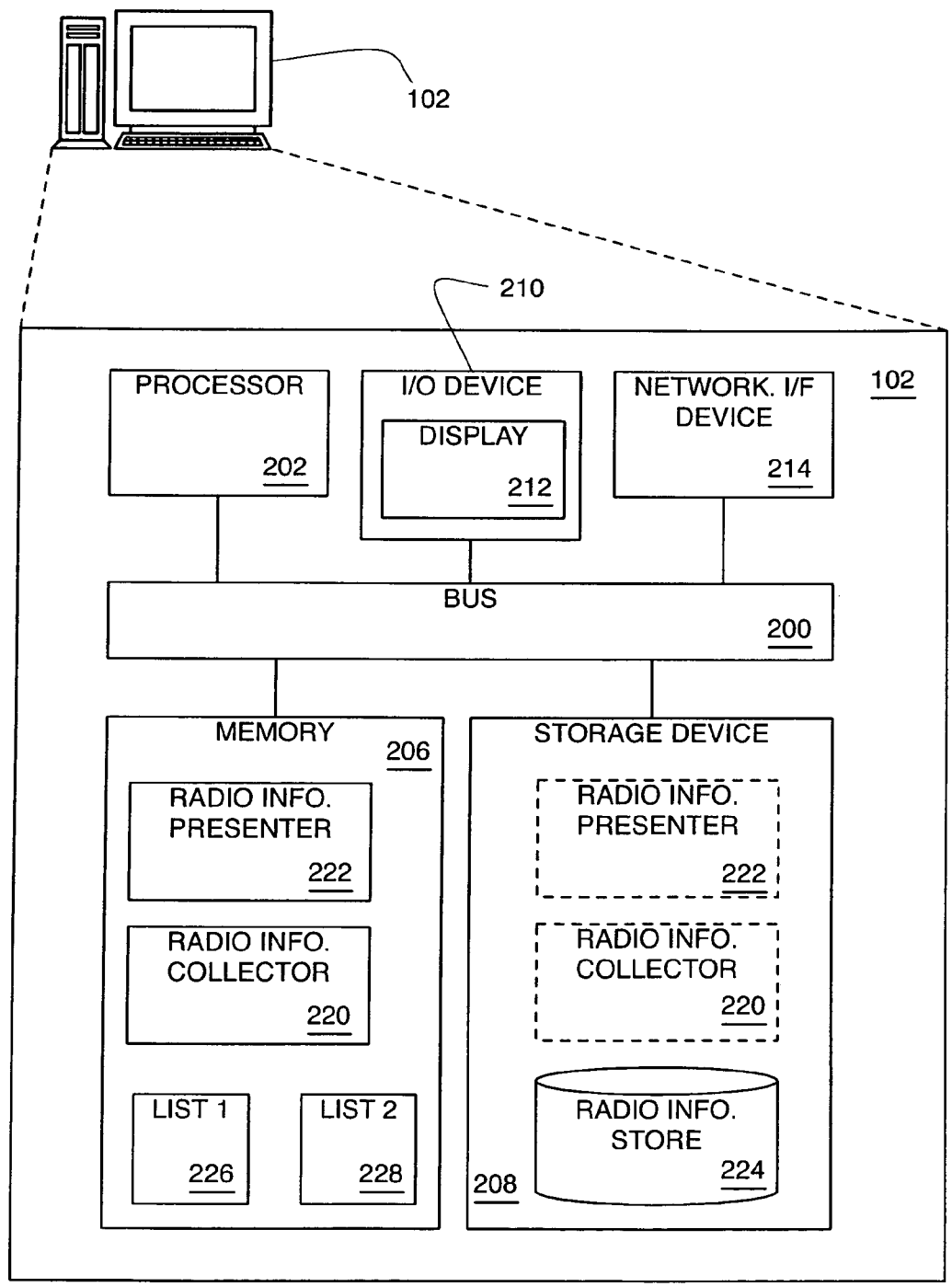
FIG. 2 is a high level functional block diagram of a portion of a network manager computer usable in conjunction with an embodiment.

FIG. 2 depicts a high level functional block diagram of network manager 102, e.g., a computer system, on which an embodiment may be implemented and executed to obtain and generate data for a single view of wireless connectivity data having two perspectives. Network manager 102 comprises a bus 200 or other communication mechanism for communicating information, and a processor 202 coupled with the bus 200 for processing information. Network manager 102 also comprises a memory 206, such as a random access memory (RAM) or other dynamic storage device, coupled to the bus 200 for storing wireless connectivity data, and instructions to be executed by processor 202. Memory 206 also may be used for storing temporary variables or other intermediate information during execution of instructions to be executed by processor 202. Network manager 102 further comprises a storage device 208, such as a magnetic disk or optical disk, is provided and coupled to the bus 200 for storing wireless connectivity data, and instructions.

Network manager 102 may be coupled via bus 200 to an input and/or output (I/O) device 210, e.g., a display 212, such as a cathode ray tube (CRT) or a flat panel display, for displaying a view having two perspectives of wireless connectivity data to a network administrator. An input device (not shown), such as a keyboard including alphanumeric and function keys, is coupled to bus 200 for communicating information and command selections to processor 202. Another type of user input device (not shown) is a mouse, a trackball, or cursor direction keys for communicating direction information and command selections to processor 202 and for controlling cursor movement on display 212. This input device typically has two degrees of freedom in two axes, a first axis (e.g., x) and a second axis (e.g., y) allowing the device to specify positions in a plane.

According to an embodiment, the wireless connectivity data obtained and analyzed by network manager 102 in response to processor 202 executing sequences of instructions contained in memory 206 in response to input received via I/O device 210 or a network interface device 214. Such instructions may be read into memory 206 from another computer-readable medium, such as storage device 208.

However, the computer-readable medium is not limited to devices such as storage device 208. For example, the computer-readable medium may comprise a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an electrically programmable ROM (EPROM), a FLASH-EPROM, any other memory chip or cartridge, or any other medium from which a computer can read. Execution of the sequences of instructions contained in memory 206 causes processor 202 to perform the process steps described below. In alternative embodiments, hard-wired circuitry may be used in place of or in combination with computer software instructions to implement the invention. Thus, embodiments are not limited to any specific combination of hardware circuitry and software.

Network manager 102 also comprises network interface device 214 coupled to bus 200. Network interface device 214 provides two-way data communication as is known. For example, network interface device 214 may be an integrated services digital network (ISDN) card, a digital subscriber line (DSL) card, or a modem to provide a data communication connection to a corresponding type of telephone line. As another example, network interface device 214 may be a local area network (LAN) card to provide a data communication connection to a compatible LAN. Wireless links may also be implemented. In any such implementation, network interface device 214 sends and receives electrical, electromagnetic or optical signals which carry digital data streams representing various types of information. Of particular note, the communications through interface device 214 may permit transmission or receipt of wireless connectivity data from radios 104-107.

Network manager 102 can send messages and receive data, including program code, through the network(s), via network interface device 214. Received code may be executed by processor 202 as it is received, and/or stored in storage device 208, or other non-volatile storage for later execution. In this manner, network manager 102 may obtain application code in the form of a carrier wave.

Memory 206 comprises one or more sets of executable instructions forming a radio information collector module 220 and a radio information presenter module 222. Radio information collector module 220, when executed by processor 202, causes the processor to collect information from a radio, e.g., radio 104. For example, processor 202 executing radio information collector module 220 causes network manager 102 to connect via a wired or wireless network connection using network interface device 214 to radio 104 and request wireless connectivity data from the radio. If the contacted radio 104 has stored (previously obtained) wireless connectivity data, the radio provides the data to network manager 102 in response to the received request. If the contacted radio 104 does not have the requested wireless connectivity data, the radio may be placed into a scan or detect mode to collect the requested connectivity data. After receiving the connectivity data, radio 104 provides the data to network manager 102 in response to the received request. Wireless connectivity data may comprise radio frequency (RF) scan data including RF signal data, channel data, security information, and other information regarding radios able to be seen by radio 104. Data that can be collected comprises received signal strength, signal and/or protocol type (e.g., 802.11 type such as 802.11a, 802.11b, 802.11g, etc.), service set identifier (SSID), basic service set identifier (BSSID), MAC address of a transmitting radio, etc.

Although an interaction between network manager 102 and radio 104 is described, the interaction may occur between the network manager and one or more of the network-connected devices (radios) which are capable of responding to the request for connectivity data, e.g., radios 104-107, as well as radio 112, and wireless devices 114 and 116.

After receipt of wireless connectivity data from radio 104, radio information collector 220 stores the connectivity data in a radio information data store 224 in storage device 208. In another embodiment, radio information collector 220 stores the received wireless connectivity data in memory 206. Radio information collector 220 notifies radio information presenter 222 of the receipt of wireless connectivity data from radio 104.

Radio information presenter 222, when executed by processor 202, causes the processor to sort the wireless connectivity data, either stored in radio information data store 224 or memory 206 depending on the particulars of the embodiment. Radio information presenter 222 sorts the wireless connectivity data into at least two lists 226, 228 based on a predetermined radio selection, e.g., radio 104. The predetermined radio selection may be determined based on another set of executable instructions and/or a user generated input received from either I/O device 210 and/or network interface device 214. The two lists generated by radio information presenter 222 comprise: (1) a first list 226 of wireless devices to which the predetermined radio, e.g., radio 104, has detected, i.e., a 'has-detected' list, and (2) a second list 228 of wireless devices which have detected the predetermined radio, i.e., a 'has-been-detected-by' list. In order to generate the first list, radio information presenter 222 sorts the received wireless signal detection data based on the radio from which the wireless signal data was received. In order to generate the second list, radio information presenter 222 sorts the received wireless signal detection data based on which signal data indicates an ability to detect the predetermined radio, e.g., radio 104. In another embodiment, radio information presenter 222 stores the two lists 226, 228 in storage device 208. In a further embodiment, presenter 222 stores sort commands for generating the two lists 226, 228 in storage device 208.

Figure 3:
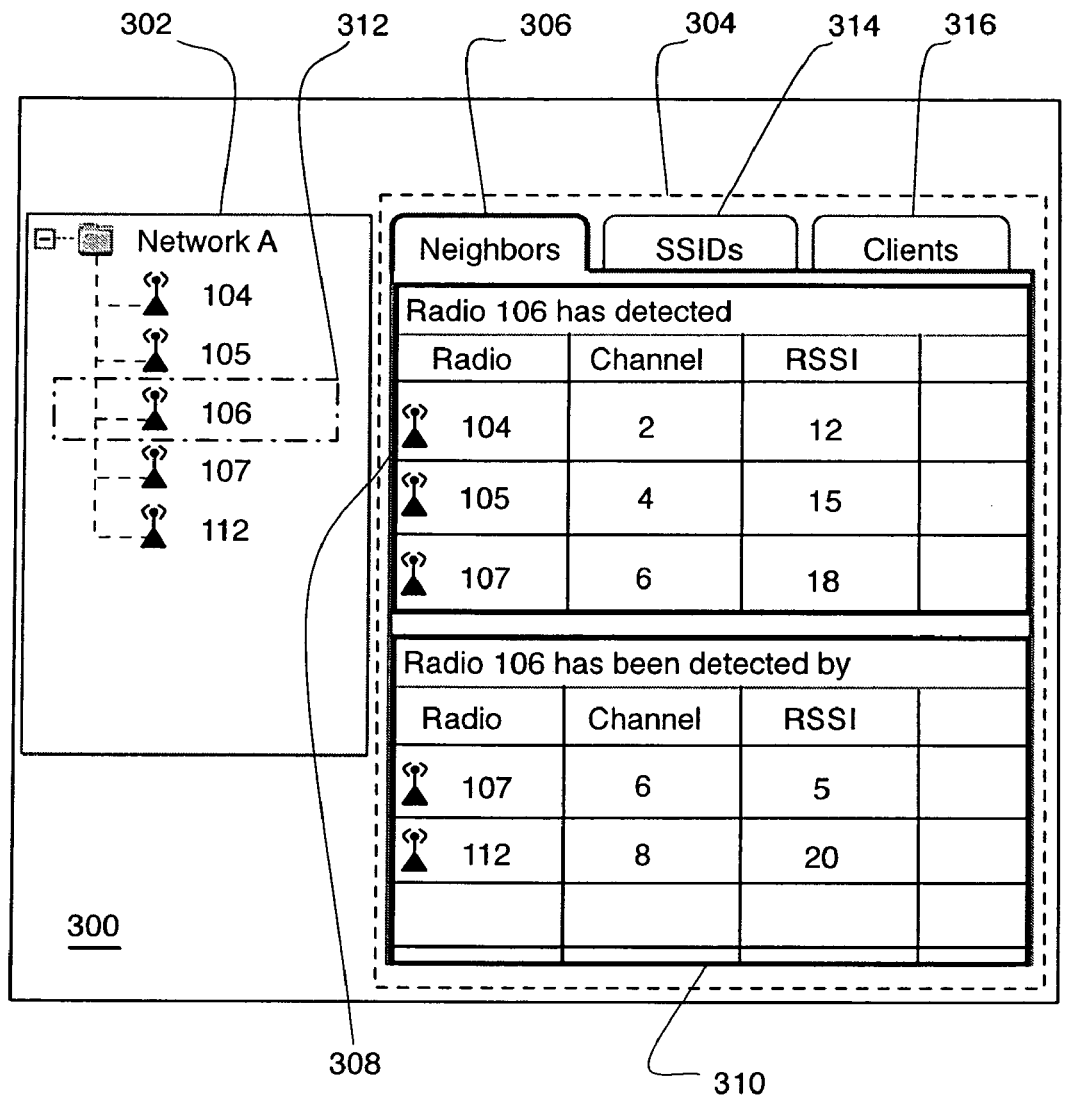
FIG. 3 is an example interface usable in conjunction with an embodiment.

After generation of the two lists, radio information presenter 222 causes processor 202 to generate a display on display 212 of the two generated lists 226, 228. FIG. 3 depicts a portion of a window 300 displayed by display 212. Window 300 comprises a first pane 302 depicting a listing of wireless devices accessible by network manager 102. A second area 304 comprises a tabbed display portion displaying the contents of a neighbors tab 306. Neighbors tab 306 comprises an upper pane 308 and a lower pane 310 corresponding to at least a portion of the contents first ('has-detected') list 226 and second ('has-been-detected-by') list 228.

Window 300 indicates at dashed line box 312 a selection of a wireless device, i.e., radio 106. Selection of radio 106 causes the display in upper pane 308 of list 226 corresponding to a list of radios from which the selected radio 106 has detected wireless signal. Further, selection of radio 106 causes the display in lower pane 310 of list 228 corresponding to a list of radios which are able to detect wireless signal from the selected radio 106. Additional information regarding the particular wireless signal detection data of the particular entry in upper and lower panes 308, 310 may be displayed alongside a radio identifier, e.g., signal strength of the radio, channel of the radio, etc. In other embodiments, the displayed data may vary from that depicted in FIG. 3.

Based on the depicted window 300, a network administrator at network manager 102 is able to determine that even though radio 106 is able to detect radios 104, 105, and 107, radio 106 is only able to be detected by radios 107 and 112. Thus, radio 107 is the only radio capable of communicating to and from radio 106. In this manner, a single view (window 300) is able to display two perspectives (upper and lower panes 308, 310) of wireless signal detection data to a user of network manager 102.

Additional tabs 314 and 316 may be present in an embodiment in order to display additional perspectives on the wireless connectivity data.

In accordance with an embodiment, a user manipulating I/O device 210 may change the selected radio in window 300, e.g., the user may select a different radio in first pane 302, upper pane 308, and lower pane 310. Changing the selected radio in window 300 causes radio information presenter 222 to cause display 212 to display wireless connectivity data related to the selected radio.

In an embodiment, a change of the selected radio causes radio information presenter 222 to cause radio information collector 220 to request wireless signal detection data from the radio corresponding to the newly selected radio. Further, radio information collector 220 may request wireless signal detection data from one or more of the remaining radios in the network. In another embodiment, a change of the selected radio causes radio information presenter 222 to generate two new lists 226, 228 based on wireless signal detection data related to the newly selected radio.

In a further embodiment, radio information collector 220 generates 'has-detected' list 226 based on the receipt of wireless signal detection data from a particular radio. According to this embodiment, radio information collector 220 updates 'has-been-detected-by' list 228 based on the received wireless signal detection data from the particular radio. In a further embodiment, radio information collector 220 generates a 'has-detected' list 226 for each particular radio from which network manager 102 received wireless signal detection data. According to this embodiment, radio information collector 220 generates a 'has-been-detected-by' list 228 for each particular radio in the network which has been scanned by at least one other radio.

Figure 4:
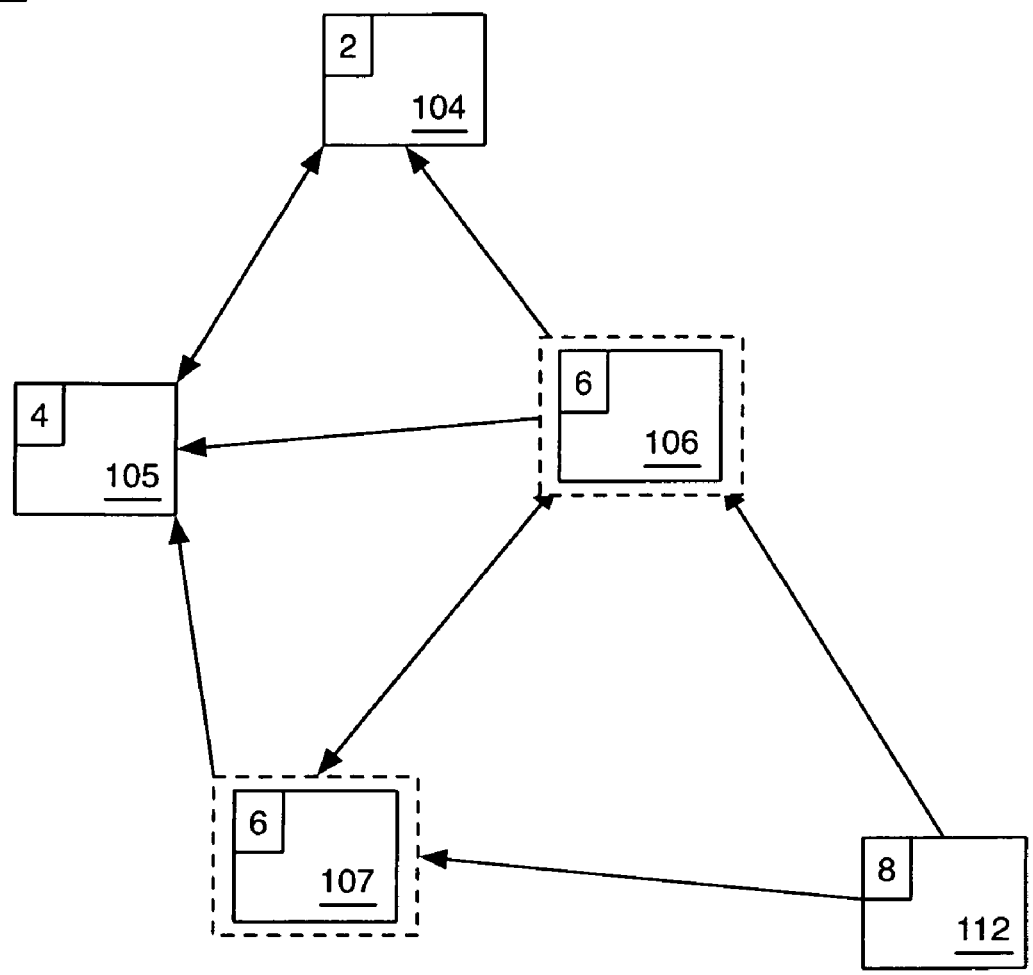
FIG. 4 is an example interface usable in conjunction with another embodiment.

FIG. 4 depicts at least a portion of a graphical view 400 of wireless signal detection data according to another embodiment. FIG. 4 graphically depicts signal detection between radios 104-107 and 112 of FIG. 1 and in accordance with at least the wireless signal detection data of FIG. 3.

As such, radio 106 is able to be detected by radios 104-107 and radios 107 and 112 are able to be detected by radio 106, as indicated by the directional arrows attached to the radio connections in FIG. 4. That is, the connecting line between radio 106 and radio 112 comprises an arrow at the end nearer radio 106 in order to indicate that radio 112 is able to be detected by radio 106. An arrow is not at the end nearer radio 112 in order to indicate that radio 112 is unable to detect radio 106.

Connecting lines between the remaining depicted radios indicate whether a particular radio is able to detect/be detected by another radio. Radios 104 and 105 are indicated as being able to detect each other. Radio 107 is indicated as being able to be detected by radio 105; however, radio 105 is not indicated as being able to be detected by radio 107.

In accordance with the FIG. 4 embodiment, a number in a box in the upper left corner of a particular radio indicates the channel used by that particular radio in graphical view 400. For example, radio 106 is communicating using channel 6, radio 104 is communicating using channel 2, radio 105 is communicating using channel 4, etc. Graphical view 400 depicts overlap of channels used radios, e.g., as indicated by additional dashed line box surrounding radios 106 and 107 as both are using channel 6 for communication, where radio 106 and radio 107 are both able to detect each other.

What is claimed is:

1. A network manager for generating a single view of wireless signal detection data including two perspectives, comprising:
   a display;
   a device information collection mechanism arranged to collect information from a wireless device; and
   a device information presentation mechanism arranged to:
   cause a list of wireless devices accessible by the network manager to be displayed on the display;
   cause the generation of two lists of information based on information collected by the device information collection mechanism, wherein the two lists of information comprise:
      a first list that only includes all wireless devices which a wireless device selected from the list of wireless devices accessible by the network manager is able to detect at a particular time;
      a second list that only includes all wireless devices which are able to detect the selected wireless device at the particular time; and
   cause the first list and the second list to be displayed on the display simultaneously.

2. A system according to claim 1, wherein the device information presentation mechanism is arranged to cause the generation of the list of wireless devices which are able to detect the preselected wireless device by sorting information from the wireless devices which are able to detect the preselected wireless device.

3. The network manager of claim 1, wherein the device information presentation mechanism is arranged to cause the generation of the first list and the second list in response to the selected wireless device being selected from the list of wireless devices accessible by the network manager.

4. The network manager of claim 3, wherein the device information presentation mechanism is arranged to cause the generation of two different lists of information based on information collected by the device information collection mechanism in response to a different wireless device being selected from the list of wireless devices accessible by the network manager;
   wherein the two different lists of information comprise:
      a third list of all wireless devices which the different selected wireless device is able to detect; and
      a fourth list of all wireless devices which are able to detect the different selected wireless device.

5. The network manager of claim 1, wherein the first list includes at least one wireless device that is not included in the second list.

6. The network manager of claim 1, wherein the second list includes at least one wireless device that is not included in the first list.

7. A method of generating a single view of wireless data including two perspectives, comprising:
   displaying a list of wireless devices accessible by a network manager;
   selecting a wireless device from the list of wireless devices accessible by the network manager;
   generating two lists of wireless information related to the selected wireless device, wherein the two lists of information comprise:
      a first list that only includes all wireless devices which the selected wireless device is able to detect at a particular time; and
      a second list that only includes all wireless devices which are able to detect the selected wireless device at the particular time; and
   displaying the first list and the second list simultaneously with the list of wireless devices accessible by the network manager.

8. A method according to claim 7, comprising:
   collecting information from one or more of the wireless devices accessible by the network manager, wherein the collected information comprises: the wireless devices which one of the one or more wireless devices is able to detect and the wireless devices able to detect one of the one or more wireless devices.

9. The method of claim 8, wherein the method includes generating two different lists of information based on the collected information in response to a different wireless device being selected from the list of wireless devices accessible by the network manager;
wherein the two different lists of information comprise:
a third list that only includes all wireless devices which the different selected wireless device is able to detect at the particular time; and
a fourth list that only includes all wireless devices which are able to detect the different selected wireless device at the particular time.

10. A method according to claim 7, comprising:
generating a third list of information including the wireless devices in the first list and the second list and the selected wireless device.

11. A method according to claim 7, comprising:
repeating the generating for a wireless device in one of the first list and the second list.

12. A method according to claim 7, wherein the generating comprises generating the list of wireless devices which are able to detect the preselected wireless device using information from the wireless devices which are able to detect the preselected wireless device.

13. A method according to claim 7, wherein the generating the list of wireless devices which the preselected wireless device is able to detect comprises generating using only the response of the preselected wireless device.

14. The method of claim 7, wherein the method includes generating the first list and the second list in response to the selection of the wireless device from the list of wireless devices accessible by the network manager.

15. A non-transitory computer-readable storage medium configured to store instructions which, when executed by a processor, cause the processor to:
generate two lists of wireless information related to a preselected wireless device, wherein the two lists of information comprise:
a first list that only includes wireless devices which the preselected wireless device is able to detect at a particular time; and
a second list that only includes wireless devices which are able to detect the preselected wireless device at the particular time;
cause a list of wireless devices accessible by a network manager to be displayed; and
cause the first list and the second list to be displayed simultaneously with the list of wireless devices accessible by the network manager
wherein the second list comprises the list of all of the wireless devices which are able to receive radio frequency emissions from the preselected wireless device at the particular time.

16. A non-transitory computer-readable storage medium according to claim 15, wherein the instructions comprise:
a device information collection mechanism arranged to collect information from all of the wireless devices of a network; and
a device information presentation mechanism arranged to perform the generating based on information collected by the device information collection mechanism and to cause the generation of the first list and the second list in response to the preselected wireless device being selected from all of the wireless devices of the network.

17. A network manager for generating a single view of wireless data including two perspectives, comprising:
a display;
wireless device information collection means for collecting information about one or more wireless devices;
list generation means for:
generating two lists of wireless device information related to a preselected wireless device wherein the two lists comprise:
a first list that only includes all wireless devices which the preselected wireless device is able to detect at a particular time; and
a second list that only includes all wireless devices which are able to detect the preselected wireless device at the particular time;
causing a list of wireless devices accessible by the network manager to be displayed on the display; and
causing the first list and the second list to be displayed on the display simultaneously with the list of wireless devices accessible by the network manager.

18. The network manager of claim 17, wherein the preselected wireless device is selectable from the list of wireless devices accessible by the network manager.

19. The network manager of claim 18, wherein list generation means is arranged to cause the generation of the first list and the second list in response to the preselected wireless device being selected from the list of wireless devices accessible by the network manager.

20. The network manager of claim 19, wherein the list generation means is arranged to cause the generation of two different lists of information based on information collected by the information collection means in response to a different wireless device being selected from the list of wireless devices accessible by the network manager;
wherein the two different lists of information comprise:
a third list that only includes all wireless devices which the different selected wireless device is able to detect at the particular time; and
a fourth list that only includes all wireless devices which are able to detect the different selected wireless device at the particular time.

* * * * *

UNITED STATES PATENT AND TRADEMARK OFFICE
CERTIFICATE OF CORRECTION

| | |
|---|---|
| PATENT NO. | : 8,149,797 B2 |
| APPLICATION NO. | : 11/477915 |
| DATED | : April 3, 2012 |
| INVENTOR(S) | : Jesse Hummer |

Page 1 of 1

It is certified that error appears in the above-identified patent and that said Letters Patent is hereby corrected as shown below:

In the Claims:

In column 6, line 16, in Claim 2, delete "A system according to" and insert -- The network manager of --, therefor.

In column 8, line 35, in Claim 19, after "wherein" insert -- the --.

Signed and Sealed this
Seventeenth Day of September, 2013

Teresa Stanek Rea
*Deputy Director of the United States Patent and Trademark Office*